Sept. 30, 1958      F. SCHWARZER      2,853,827
BARBLESS FISH HOOK AND METHOD OF MAKING THE SAME
Filed April 24, 1957
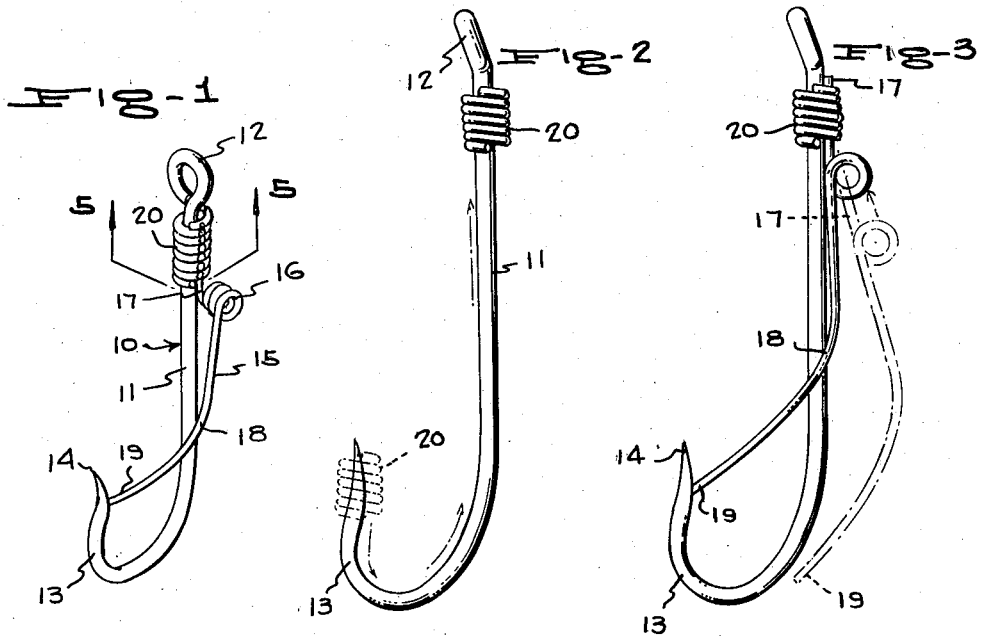
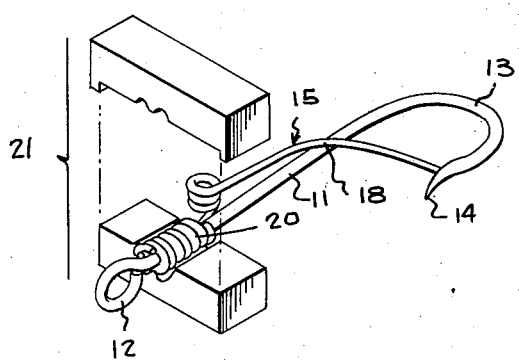
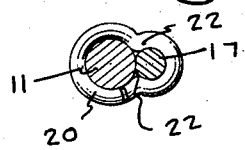
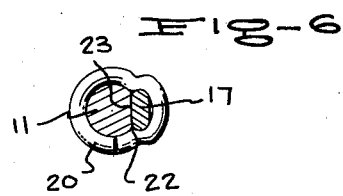
INVENTOR.
FRED SCHWARZER
BY Christian P. Nielsen
ATTORNEY

United States Patent Office 2,853,827
Patented Sept. 30, 1958

2,853,827
BARBLESS FISH HOOK AND METHOD OF MAKING THE SAME

Fred Schwarzer, Pottstown, Pa.

Application April 24, 1957, Serial No. 654,854

4 Claims. (Cl. 43—43.4)

This invention relates to fish hooks and more particularly to a hook wherein the customary barb is eliminated and to a method of assembling a flexible guard upon the shank of the hook, the free end of the guard being associated with hook portion in a manner to maintain a fish upon the hook.

It is the principal object of the invention to provide a barbless hook and associated guard, the method of assemblage of which is greatly simplified and the cost of production is reduced as compared with the production of hooks manufactured in accordance with the disclosures in my pending application filed June 4, 1954, Serial Number 434,423, which is now Patent Number 2,792,664 dated May 21, 1957.

More specifically, it is an important object of the invention to provide a novel connecting means between the shank of the hook and the shank of the guard, in the provision of an encircling metal coil formed from a metal of softer characteristics than the shanks whereby compressive force on the coil will displace and compact metal of the coil at points of contacting engagement with the shanks to obtain a rigid connection between the shanks.

Additional objects, advantages and features of invention will be apparent from the following description considered in conjunction with the accompanying drawing, wherein, Figure 1 is a perspective view of the assembled hook.

Figure 2 is a side elevation of a hook, illustrating the first step in assembly of the hook.

Figure 3 is a similar view illustrating the second step in the assembly of the guard upon the shank of the hook.

Figure 4 is a perspective view of a die means for securing the guard to the shank.

Figure 5 is a cross section on the line 5—5 of Figure 1, and

Figure 6 is a view similar to Figure 5, illustrating a modified construction of connecting the shank and guard.

Reference is now made to Figure 1 of the drawing, wherein the completed hook is generally indicated by the reference character 10, which comprises a shank 11, one end of which is formed with an eyelet 12 for connection of a fish line or leader, as is customary. The shank 11 has its other end formed into a hook member 13, the point 14 of which is slightly offset with respect to the longitudinal axis of the shank.

The guard 15 is formed from a suitable length of light weight steel wire and inwardly of one end of the wire a helical spring 16 is formed, the resultant projecting shank 17 forming an anchorage means for securement to the shank 11 as will be presently described.

The guard 15 is given a curvature as at 18 in the direction of the offset point 14 of the hook. The end 19 of the guard contacts the point 14 very lightly so that the guard may be readily flexed and moved away from the hook when a fish bites.

The assembly of the guard 15 to the shank 11 of the hook will now be described, reference being made to Figure 2, wherein it will be seen that an anchorage coil 20, indicated in dotted lines, is positioned upon the point of the barbless hook 13 and is then moved longitudinally along the shank 11, as indicated by the arrows, until the coil 20 reaches a point below the eyelet 12. The shank 17 of the guard 15 is presented into the coil 20, as indicated by dotted lines in Figure 3 and moved inwardly of the coil so that the shank of the guard lies in parallel contacting engagement with the shank of the hook. The interior diameter of the coil 20 is such as to hold the shank 17 of the guard to the shank 11 of the hook, until final assembly is accomplished by applying compressive force upon the coil 20 by a suitable die 21, as shown in Figure 4.

The coil 20 is formed from metal of softer characteristics than the shanks 11 and 17 and as clearly shown in Figure 5, since the shank 11 is of greater diameter than the shank 17, the metal of the coil will be displaced and compacted into the areas 22 at the abutting portions of the shanks when pressure is applied through the die 21.

In Figure 6, the structure is the same as in Figure 5, except that the abutting edges of the shanks are flattened.

While I have shown and described preferred forms of the hook and the manner of assembling the same, this is by way of illustration only, and I consider as my own all such modifications in construction as fairly fall within the scope of the appended claims.

I claim:

1. The method of assembling a guard upon the shank of a barbless fish hook comprising the steps of threading a wire coil upon the shank of the fish hook to a point adjacent the upper end of the shank, inserting one end of the guard within said wire coil so as to be in contacting engagement with the shank and applying compressive force to the sides of said wire coil.

2. The method of assembling the shank of a guard upon the shank of a barbless fish hook comprising the steps of threading a wire coil upon the shank of the fish hook to a point adjacent the upper end of the shank, inserting the shank of the guard within said wire coil and in contacting engagement with the shank of the hook, the shank of the hook being of greater diameter than the shank of the guard forming a reduced area at the contacting portions of said shanks, the wire forming said wire coil being of softer metal than the shanks of said hook and guard whereby compressive force applied to the sides of said wire coil will displace and compact portions of the wire into the reduced area defined by the shanks.

3. In a barbless fish hook having a shank and an eyelet at the upper end thereof, a wire coil encircling said shank and positioned below said eyelet, a flexible metallic guard member having a shank disposed within said coil in contacting engagement with the shank of the hook, the wire of said wire coil being of softer metal than said shanks, the shank of the hook being of greater diameter than the shank of the guard member defining a reduced area at the contacting portions of said shanks whereby compressive force upon opposite sides of said wire coil will displace and compact portions of the wire into the reduced area defined by the shanks.

4. The structure of claim 3, wherein the shank of the guard includes a helical spring for urging the free end of the guard into releasable contact engagement with the barbless fish hook.

No references cited.